(Model.)

R. ELLIOTT.
ANIMAL TRAP.

No. 244,572.  Patented July 19, 1881.

WITNESSES:
Donn Twitchell
C. Sedgwick

INVENTOR:
R. Elliott
BY Munn & Co
ATTORNEYS.

UNITED STATES PATENT OFFICE.

RUSSELL ELLIOTT, OF SOMERSET, KENTUCKY.

ANIMAL-TRAP.

SPECIFICATION forming part of Letters Patent No. 244,572, dated July 19, 1881.

Application filed May 28, 1881. (Model.)

*To all whom it may concern:*

Be it known that I, RUSSELL ELLIOTT, of Somerset, in the county of Pulaski and State of Kentucky, have invented a new and useful Improvement in Animal-Traps, of which the following is a specification.

Figure 1:
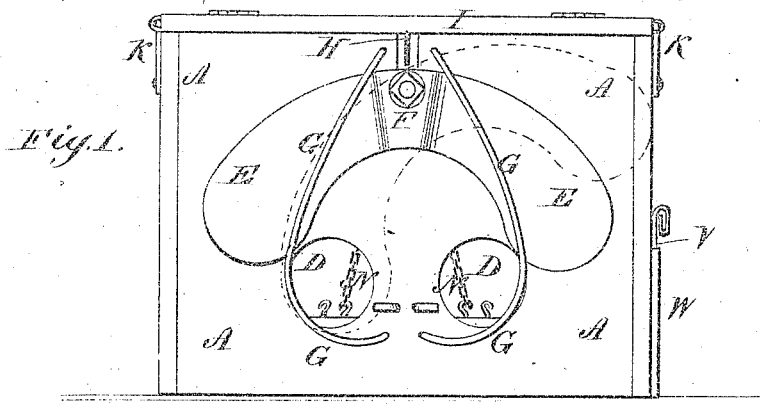
Figure 2:
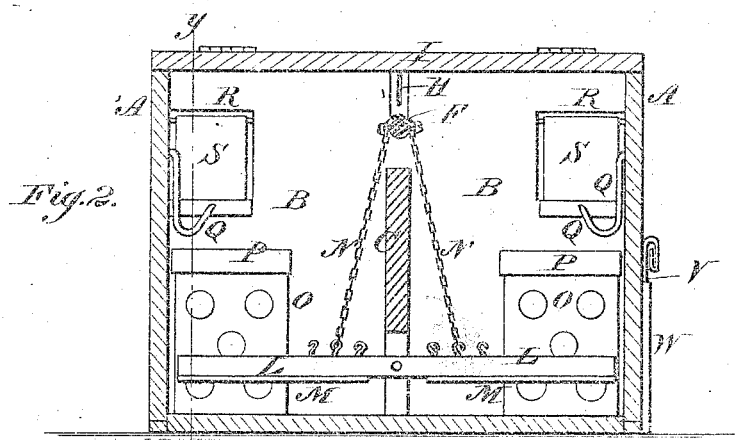
Figure 3:
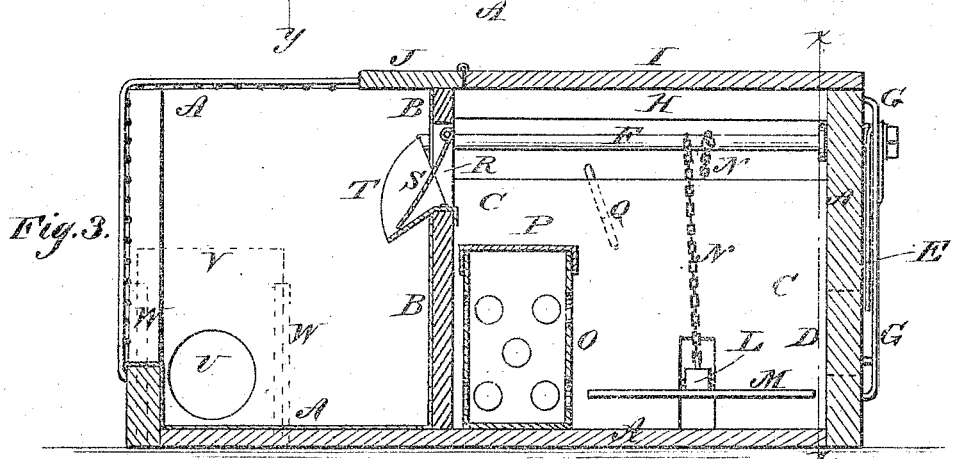

Figure 1 is a front elevation of my improvement. Fig. 2 is a sectional front elevation of the same, taken through the line $x\ x$, Fig. 3. Fig. 3 is a sectional side elevation of the same, taken through the line $y\ y$, Fig. 2.

Similar letters of reference indicate corresponding parts.

The object of this invention is to facilitate the catching of rats and other animals.

The invention consists in constructing an animal-trap with a box divided into three compartments by two partitions, a sliding plate for closing the entrance-apertures in the front of the trap, the rock-shaft carrying the sliding plate, the oscillating treadle, the chains or cords connecting the treadle and the rock-shaft, and the drop-doors and inclined spouts secured in apertures in the cross-partition for connecting the front and rear compartments, all constructed and operating as will be hereinafter fully described.

A represents a box of suitable length, breadth, and height, reference being had to the size of the animal trapped for. The box A is divided into two compartments by a cross-partition, B, and the front compartment thus formed is subdivided into two compartments by a longitudinal partition, C.

In the lower part of the front of the trap, upon the opposite sides of and equally distant from the partition C, are formed two apertures, D, leading into the two front compartments of the trap, and of such a size that the animals trapped for can readily pass through the said apertures.

Against the forward end of the trap is placed a sliding plate, E, made in the form of a semicircle, with a semicircular notch in its lower edge and with its ends rounded off, as shown in Fig. 1. The plate E is made of such a size that when it is attached at its center to the forward end of a rod or shaft, F, either end, when swung down, will cover one of the apertures D. The plate or door E is kept from being pushed outward by the animal in trying to escape through the aperture D by keepers G attached to the front of the trap, and between which and the said front the said plate slides. The shaft F rocks in bearings in the upper parts of the partitions C and the front of the trap. The space above the shaft F is closed by a plate, H, attached to the lower side of the forward part I of the cover of the trap, in line with and above the partition C, so that the animals cannot pass from one side to the other of the said partition C over the said shaft F. The part I of the cover is hinged at its rear edge to the stationary part J of the said cover, to serve as a door to give admission to the front compartments of the trap. The part I of the cover is secured in place, when closed, by hooks K or other suitable fastenings.

In a slot in the lower part of the partition C is pivoted the center of the cross-bar L, to the end parts of which are attached the plates M.

To the cross bar L, upon the opposite sides of and equally distant from its pivot, are attached the lower ends of two chains or cords, N, the upper ends of which pass around and are attached to the shaft F.

In the rear outer corner of each front compartment is secured a bait-box, O, which has apertures formed in its sides to admit air. The bait-boxes O are provided with covers P, and are designed to receive young chickens or other bait that will attract the animals trapped for.

To the sides of the trap A, over the bait-boxes O, are attached hooks Q, to receive other bait when desired.

In the partition B, above the tops of the bait-boxes O, are formed apertures R, of such a size that the animals can readily pass through them. In the apertures R, near their tops, are hinged plates or drop-doors S, the lower ends of which rest upon the downwardly-inclined bottoms of the spouts T secured in the said apertures R. The downward inclination of the spout T, in connection with the drop-doors S, prevents the animal from returning through the apertures R.

In the side of the rear part of the box A is formed an aperture, U, through which the caught animals can be removed. The aperture U is closed by a plate, V, sliding in rabbeted cleats W attached to the side of the said box A.

With this construction the trap is set by adjusting the treadles L M in a horizontal position, which leaves both the apertures D uncovered, as shown in Fig. 1. As thus arranged, if an animal enters the trap through one of the apertures D, he steps upon the treadle L M, and as he passes toward the outer part of the said treadle to approach the bait-box he tilts the treadle, which turns the shaft F and moves the plate E to cover the aperture D through which he entered. In seeking to escape the animal jumps upon the top of the bait-box, raises the drop-door S, and jumps or falls into the rear compartment of the trap, whence he cannot escape. The treadle should be so adjusted that it will not trip until the animal approaches the outer part of the said treadle. This adjustment may be made by attaching the ends of the chains N nearer to or farther from the pivot of the said treadle L M, as the weight of the animal trapped for may require. With this construction, when one of the apertures D is closed by the movement of the plate E the other aperture D remains uncovered for another animal to enter the front compartment of the trap, so that the trap is self-setting.

The wall of the rear compartment can be formed, in whole or in part, of wires, to admit light to the said compartment, so that the animals caught will not seek to escape by the way they entered, and thus alarm other animals that may be entering the trap.

Having thus fully described my invention, I claim as new and desire to secure by Letters Patent—

1. An animal-trap, constructed substantially as herein shown and described, consisting of the box A, divided into three compartments by the partitions B C, the sliding plate E, closing the apertures D in the front of the trap, the rock-shaft F, carrying the plate E, the oscillating treadle L M, the chains N, connecting the treadle and the rock-shaft, and the drop-doors S and inclined spouts T, secured in apertures in the cross-partition B, as set forth.

2. In an animal-trap, the combination, with the box A, having apertures D and the partitions B C, of the sliding plate E, the rock-shaft F, the connecting chains or cords N, and the treadles L M, substantially as herein shown and described, whereby the entrance-aperture will be closed by the movement of the treadle, as set forth.

RUSSELL × ELLIOTT.
his mark.

Witnesses:
H. H. GIBSON,
ROB. GIBSON,
W. B. PETTUS.